United States Patent
Ni et al.

(10) Patent No.: US 8,183,842 B2
(45) Date of Patent: May 22, 2012

(54) CONTROL DEVICE FOR A MULTI-PHASE DC-DC CONVERTER AND RELATED MULTI-PHASE DC-DC CONVERTER

(75) Inventors: Chia-Ning Ni, Taoyuan County (TW); Chih-Yuan Chen, Hsinchu (TW)

(73) Assignee: Anpec Electronics Corporation, Hsinchu Science Park, Hsin-Chu (TW)

( * ) Notice: Subject to any disclaimer, the term of this patent is extended or adjusted under 35 U.S.C. 154(b) by 476 days.

(21) Appl. No.: 12/507,086

(22) Filed: Jul. 22, 2009

(65) Prior Publication Data

US 2010/0315047 A1    Dec. 16, 2010

(30) Foreign Application Priority Data

Jun. 16, 2009 (TW) .............................. 98120047 A

(51) Int. Cl.
*G05F 1/00* (2006.01)
(52) U.S. Cl. .......................... 323/272; 363/69
(58) Field of Classification Search ............ 323/271, 323/272, 285; 363/65, 69, 70
See application file for complete search history.

(56) References Cited

U.S. PATENT DOCUMENTS 6,292,378 B1 * 9/2001 Brooks et al. ................... 363/65
* cited by examiner

*Primary Examiner* — Harry Behm
*Assistant Examiner* — Matthew Grubb
(74) *Attorney, Agent, or Firm* — Winston Hsu; Scott Margo

(57) ABSTRACT

A control device for a multi-phase DC-DC converter is disclosed. The multi-phase DC-DC converter includes a plurality of converting channels. The control device includes an error amplifier for comparing a feedback signal of the multi-phase DC-DC converter and a reference signal to generate a comparison result, a main comparator for comparing the comparison result and a first sawtooth signal corresponding to a first converting channel of the plurality of converting channels to generate a first PWM signal, and at least one computing module each corresponding to one of the plurality of the converting channels, for generating a PWM signal according to the comparison result, a corresponding sawtooth signal, a corresponding sensing signal, and a sensing signal corresponding to a previous converting channel of the converting channel to control the converting channel.

8 Claims, 10 Drawing Sheets

CONTROL DEVICE FOR A MULTI-PHASE DC-DC CONVERTER AND RELATED MULTI-PHASE DC-DC CONVERTER

BACKGROUND OF THE INVENTION

1. Field of the Invention

The present invention is related to a control device for a multi-phase DC-DC converter and related multi-phase DC-DC converter, and more particularly, to a control device and related multi-phase DC-DC converter device for systematically adjusting a channel current of a current converting channel by comparing a sensing signal of the current converting channel with a sensing signal of a previous converting channel to balance a channel current of each converting channel.

2. Description of the Prior Art

An electronic device includes various components, each of which may operate at a different voltage level. Therefore, a DC-DC (direct current to direct current) voltage converter is definitely required to adjust (step up or step down) and stabilize the voltage level in the electronic device. With the advancement of electronic technology, various electronic devices, such as a microprocessor in a personal computer, demand ever higher operating current. Thus, a multi-phase DC-DC converter formed with a plurality of parallelized converting channels is widely adopted by circuit designers. With multiple converting channels, ripples on input and output currents of the multi-phase DC-DC converter can be dispersed over the converting channels. In other words, the circuit designers can utilize smaller, cheaper filtering capacitors in the multi-phase DC-DC converter without sacrificing filtering performance of a traditional single-phase DC-DC converter.

Please refer to FIG. 1, which is a schematic diagram of a multi-phase DC-DC converter 10 of the prior art. The multi-phase DC-DC converter 10 mainly comprises a control circuit 100, a feedback module 102, current sensors 104_1, 104_2, 104_3, 104_4, and converting channels 110_1, 110_2, 110_3, 110_4. Compared to the traditional single-phase DC-DC converter, the multi-phase DC-DC converter 10 can provide a higher output current IOUT via the parallelized converting channels 110_1, 110_2, 110_3, 110_4. Note that each of the converting channels includes a power switch (112_1-112_4) and an output inductor (L_1-L_4), and a duty cycle of the power switches 112 is determined by a corresponding pulse width modulation (PWM) signal outputted by the control circuit 100, so as to produce a desired channel current (ICH[1]-ICH[4]). However, due to unpredictable manufacturing process variations or other factors, individual differences exist between the converting channels 110_1, 110_2, 110_3, 110_4, such that some of the converting channels are irrationally burdened with heavier current loadings. In other words, power components of each of the converting channels 110_1, 110_2, 110_3, 110_4 are burdened with unequal current loadings. For that reason, current bearing ability of the power components should be enhanced to ensure that the multi-phase DC-DC converter 10 can operate regularly. However, the stronger the current bearing ability, the more expensive the manufacturing cost. Even worse, if a minority of the converting channels were burdened with a majority of the overall current loading, heat would be concentrated at the minority channels, causing remarkable increases in operating temperatures of the power components of the minority channels, implying a shorter life of the power components. Therefore, the multi-phase DC-DC converter 10 has to adjust PWM signals PWM[1]-PWM[4], so as to balance current loadings of the converting channels 110_1, 110_2, 110_3, 110_4.

To balance the current loadings, the prior art has developed various methods for adjusting the PWM signals PWM[1]-PWM[4]. In detail, the current sensors 104 generate sensing signals SEN[1]-SEN[4] directly proportional to the channel currents ICH[1]-ICH[4] and sent to the control circuit 100. In addition, the feedback module 102 generates a feedback signal VFB sent to the control circuit 100 according to an output voltage VOUT of the multi-phase DC-DC converter 10. As a result, the control circuit 100 can adjust duty cycles of the PWM signals PWM[1]-PWM[4] based upon the sensing signals SEN[1]-SEN[4] and the feedback signal VFB, to balance the current loading of each converting channel. Please continue to refer to FIG. 2, which is a schematic diagram of the control circuit 100 shown in FIG. 1. The control circuit 100 includes parallelized comparators 200, 202, 204, 206, a comparison module 208 and a sawtooth wave generating module 210. The comparison module 208 and the sawtooth wave generating module 210 are respectively utilized for providing comparison results COMP[1]-COMP[4] and sawtooth signals RAMP[1]-RAMP[4] as input sources of the comparators 200, 202, 204, 206 respectively corresponding to the converting channels 110_1, 110_2, 110_3, 110_4 in accordance with the sensing signals SEN[1]-SEN[4] and the feedback signal VFB. As a result, the control circuit 100 can adjust the duty cycles of the PWM signals PWM[1]-PWM[4] by modulating the comparison results COMP[1]-COMP[4] and sawtooth signals RAMP[1]-RAMP[4]. For example, in U.S. Pat. No. 6,670,794 B1, the sensing signals SEN[1]-SEN[4] are current signals, and the sawtooth wave generating module 210 modulates the sawtooth signal of each converting channel by averaging the sensing signals SEN[1]-SEN[4], i.e.

$$RAMP[1]=RMP[1]+k \times (SEN_{AVG}-SEN[1])$$

$$RAMP[2]=RMP[2]+k \times (SEN_{AVG}-SEN[2])$$

$$RAMP[3]=RMP[3]+k \times (SEN_{AVG}-SEN[3])$$

$$RAMP[4]=RMP[4]+k \times (SEN_{AVG}-SEN[4])$$

where RMP[1], RMP[2], RMP[3], RMP[4] respectively represent standard sawtooth signals of the converting channels 110_1, 110_2, 110_3, 110_4, k is a constant, and $SEN_{AVG}=(SEN[1]+SEN[2]+SEN[3]+SEN[4])\div 4$ represents an average of the sensing signals SEN[1]-SEN[4].

In addition, in U.S. Pat. No. 6,897,636 B2, the sensing signals SEN[1]-SEN[4] are voltage signals, and the comparison module 208 modulates the comparison result of each converting channel by averaging the sensing signals SEN[1]-SEN[4], i.e.

$$COMP[1]=CMP[1]+g \times (SEN_{AVG}-SEN[1])$$

$$COMP[2]=CMP[2]+g \times (SEN_{AVG}-SEN[2])$$

$$COMP[3]=CMP[3]+g \times (SEN_{AVG}-SEN[3])$$

$$COMP[4]=CMP[4]+g \times (SEN_{AVG}-SEN[4])$$

where CMP[1], CMP[2], CMP[3], CMP[4] respectively represent unmodulated standard comparison results of the converting channels 110_1, 110_2, 110_3, 110_4, and g is a constant.

However, regardless of whether the sensing signals SEN[1]-SEN[4] are current or voltage signals, the control circuit 100 has to include massive and complex circuits to perform the step of averaging the sensing signals SEN[1]-SEN[4], implying a remarkable increase in power consumption and circuit layout area of the multi-phase DC-DC converter 10.

Therefore, balancing current loading of each converting channel in a simpler, more economical way has been a major focus of the industry.

SUMMARY OF THE INVENTION

It is therefore a primary objective of the claimed invention to provide a control device for a multi-phase DC-DC converter and related multi-phase DC-DC converter.

The present invention discloses a control device for a multi-phase DC-DC converter. The multi-phase DC-DC converter comprises a plurality of converting channels. The control device comprises an error amplifier, a main comparator and at least one computing module. The error amplifier is utilized for comparing a feedback signal of the multi-phase DC-DC converter and a reference signal to generate a comparison result. The main comparator is coupled to the error amplifier and utilized for comparing the comparison result and a first sawtooth signal corresponding to a first converting channel of the plurality of converting channels to generate a first pulse width modulation (PWM) signal. Each computing module is corresponding to one of the plurality of converting channels and utilized for generating a PWM signal according to the comparison result, a sawtooth signal corresponding to the converting channel, a sensing signal corresponding to the converting channel, and a sensing signal corresponding to a previous converting channel of the converting channel to control the converting channel.

The present invention further discloses a multi-phase DC-DC converter, which comprises an output end, a plurality of converting channels, a current sensing module, a feedback module, a reference signal generator and a control device. The output end is utilized for providing an output signal. Each converting channels comprises a power switch for adjusting a channel current of the converting channel according to a pulse width modulation (PWM) signal corresponding to the converting channel, and an output inductor coupled between the power switch and the output end. The current sensing module comprises a plurality of sensing units, each coupled to an output inductor of a corresponding converting channel to generate a feedback signal according to a channel current passing through the output inductor. The feedback module is coupled to the output end and utilized for generating a feedback signal according to the output signal. The reference signal generator is utilized for generating a reference signal. The control device comprises an error amplifier, a main comparator and at least one computing module. The error amplifier is coupled to the feedback module and the reference signal generator and utilized for comparing the feedback signal and the reference signal to generate a comparison result. The main comparator is coupled to the error amplifier and a power switch of a first converting channel of the plurality of converting channels and utilized for comparing the comparison result and a first sawtooth signal corresponding to the first converting channel to generate a first PWM signal sent to the power switch. Each computing module is corresponding to one of the plurality of converting channels and utilized for generating a PWM signal sent to a power switch of the converting channel according to the comparison result, a sawtooth signal corresponding to the converting channel, a sensing signal corresponding to the converting channel, and a sensing signal corresponding to a previous converting channel of the converting channel.

These and other objectives of the present invention will no doubt become obvious to those of ordinary skill in the art after reading the following detailed description of the preferred embodiment that is illustrated in the various figures and drawings.

DETAILED DESCRIPTION

Figure 3:
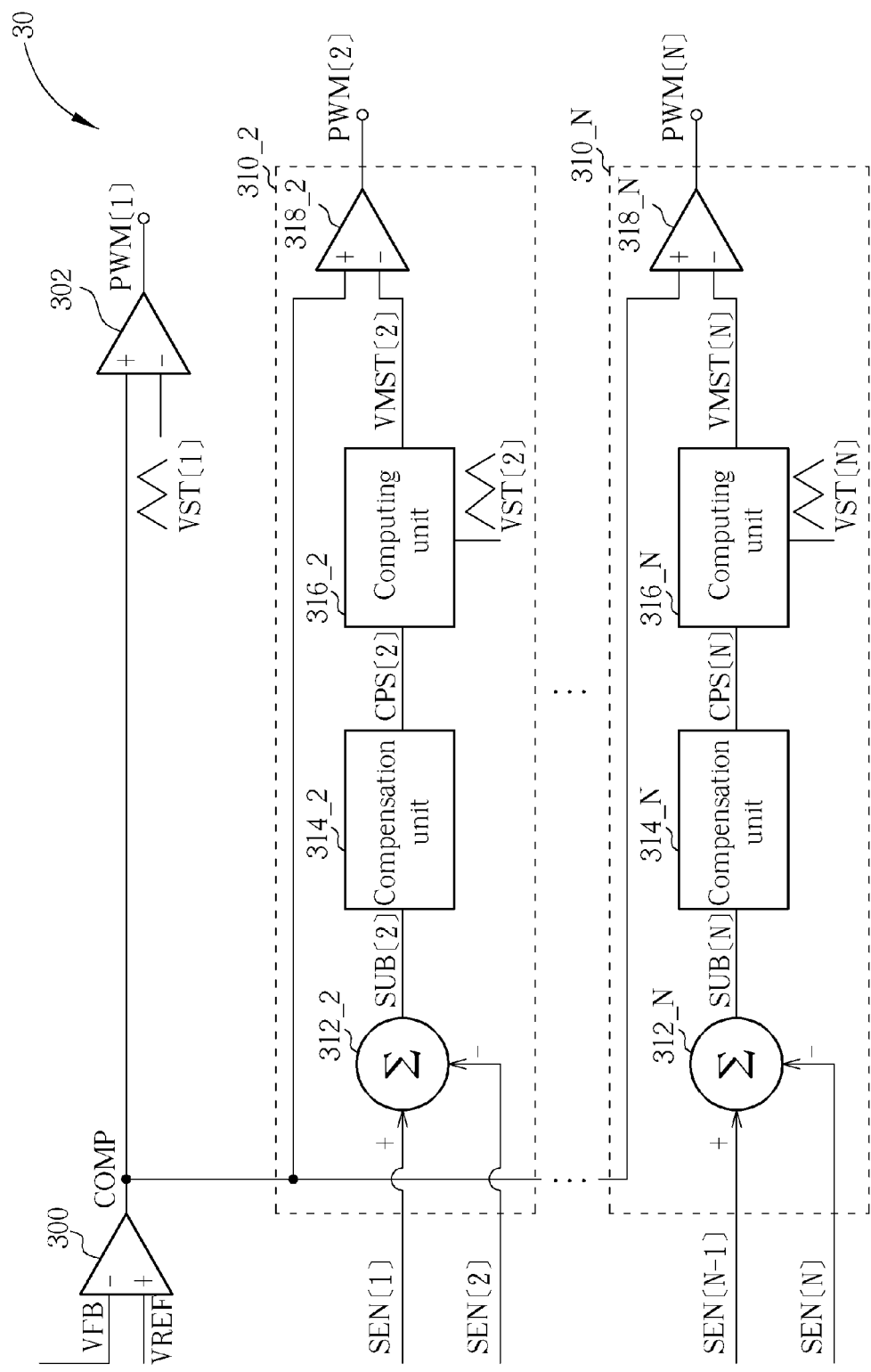
FIG. 3 is a schematic diagram of a control device according to an embodiment of the present invention.

Please refer to FIG. 3, which is a schematic diagram of a control device 30 according to an embodiment of the present invention. The control device 30 is designed for a multi-phase DC-DC converter including N converting channels. The control device 30 includes an error amplifier 300, a main comparator 302 and computing modules 310_2-310_N. The error amplifier 300 is utilized for comparing a feedback signal VFB of the multi-phase DC-DC converter and a reference signal VREF to generate a comparison result COMP. The main comparator 302 is utilized for comparing the comparison result COMP and a first sawtooth signal VST[1] corresponding to a first converting channel of the N converting channels to generate a first pulse width modulation (PWM) signal PWM[1] sent to the first converting channel. With respect to the computing modules 310_2-310_N, taking the computing module 310_2 for example, the computing module 310_2 corresponds to a second converting channel and is utilized for generating a PWM signal PWM[2] according to the comparison result COMP, a sawtooth signal VST[2] corresponding to the second converting channel, a sensing signal SEN[2] corresponding to the second converting channel, and a sensing signal SEN[1] corresponding to a previous converting channel (the first converting channel) of the second converting channel, to control the second converting channel. The computing modules 310_3-310_N function the same as the computing module 310_2, and differ only in corresponding converting channels. Therefore, functions and corresponding relationships of the computing modules 310_3-310_N can be analogized from the above description of the computing module 310_2, and are not further narrated herein.

In general, the control device 30 replaces the control circuit 100 of the multi-phase DC-DC converter 10 of the prior art, i.e. the control device 30 is utilized for balancing a channel current of each converting channel. Note that, based upon practical requirements, the control device 30 may not only be employed in the multi-phase DC-DC converter 10 including four converting channels, but also in a multi-phase DC-DC converter including a plurality of converting channels. Besides, for each of the converting channels other than the first converting channel, the control device 30 can modulate a PWM signal PWM[x] of the converting channel according to a sensing signal SEN[x] of the converting channel and a sensing signal SEN[x−1] of a previous converting channel of the converting channel. That is, an "exclusive" computing module 310-x is installed in the control device 30 for each of the converting channels other than the first converting channel. The computing module 310-x "customizes" the PWM signal PWM[x] for the converting channel based upon the sensing signals SEN[x], SEN[x−1], so as to control the converting channel.

In detail, regarding the "customization" process, please continue to refer to FIG. 3. In FIG. 3, each computing module 310_x includes a subtracter 312_x, a compensation unit 314_x, a computing unit 316_x and a parallel comparator 318_x. Taking the computing module 310_2 for example, a subtracter 312_2 subtracts the sensing signal SEN[1] of the first converting channel from the sensing signal SEN[2] of the second converting channel to generate a subtracting result SUB[2]=SEN[2]−SEN[1]. Next, the compensation unit 314_2 compensates a gain of the subtracting result SUB[2] according to the subtracting result SUB[2] to generate a compensating result CPS[2]. The computing unit 316_2 adjusts a sawtooth signal VST[2] corresponding to the second converting channel according to the compensating result CPS[2] to generate a computing result VMST[2]. Finally, the parallel comparator 318_2 compares the comparison result COMP of the error amplifier 300 and the computing result VMST[2] to generate the PWM signal PWM[2] to control the second converting channel. Certainly, "customization" processes of the computing modules 310_3-310_N can be analogized and derived from the above, and are not further narrated herein.

In short, an arbitrary computing module 310_x in charge of one of the converting channels other than the first converting channel firstly acquires a difference SUB[x] between the sensing signals SEN[x], SEN[x−1] respectively corresponding to the "current" and "previous" converting channels, i.e. the computing module 310_x computes SUB[x]=SEN[x]−SEN[x−1]; next, the computing module 310_x compensates a gain of the difference SUB[x], such as by multiplying the difference SUB[x] by a constant K to acquire a compensating result CPS[x]=K×SUB[x]=K×(SEN[x]−SEN[x−1]); and finally, the computing module 310_x adjusts the sawtooth signal VST[x] in accordance with the compensating result CPS[x] to generate a modulated sawtooth signal VMST[x]. Note that based on the spirit of the multi-phase DC-DC converter, phases of sawtooth signals VST[1]-VST[N] preferably differ by 360/N degrees in turn, i.e. ∠ VST[x]−∠VST[x−1]=360°/N. Compared to the prior art, the present invention replaces the step of averaging all sensing signals with a step of computing differences between each two adjacent sensing signals SEN[x], SEN[x−1] corresponding to two adjacent converting channels. Therefore, practical layout complexity of the circuit can be greatly simplified to reduce power consumption and simplify the steps of balancing channel currents.

Figure 4A:
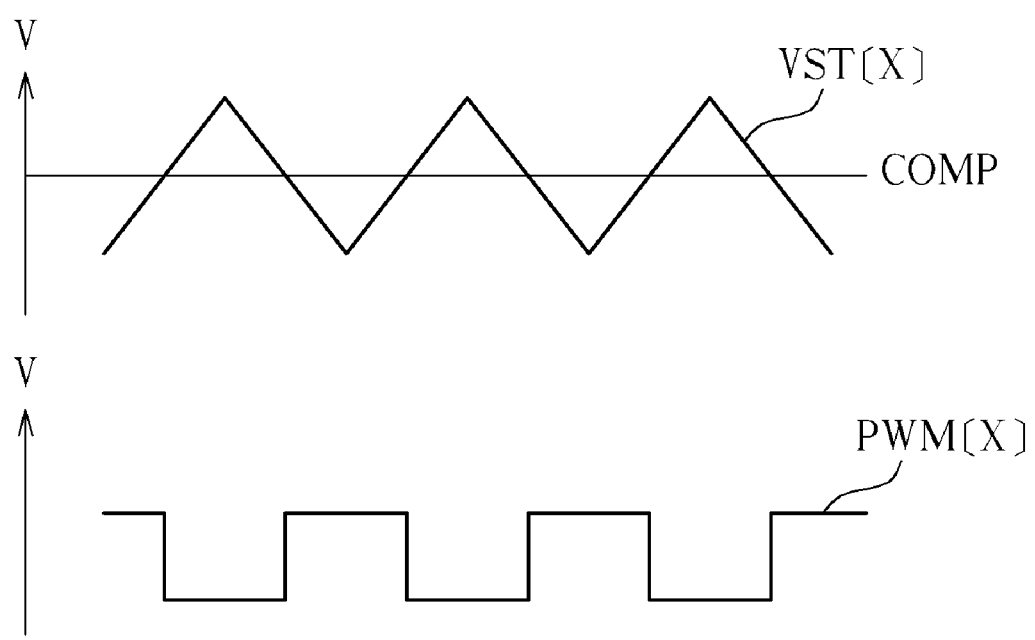
FIG. 4A-FIG. 4E are time-variant schematic diagrams of a computing result of the control device of FIG. 3 and a corresponding PWM signal.
Figure 4B:
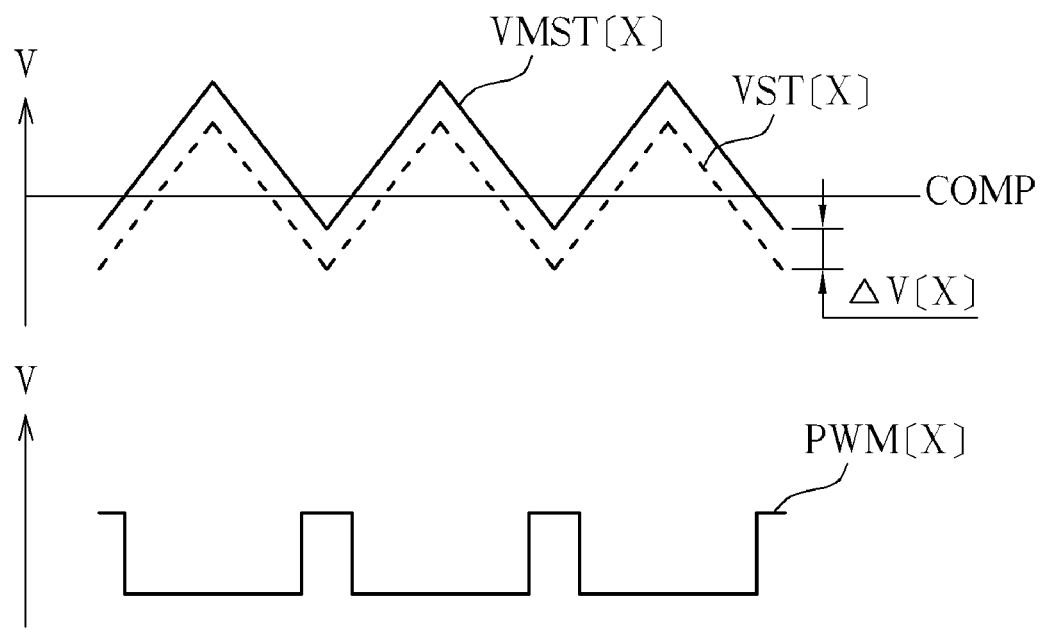
Figure 4C:
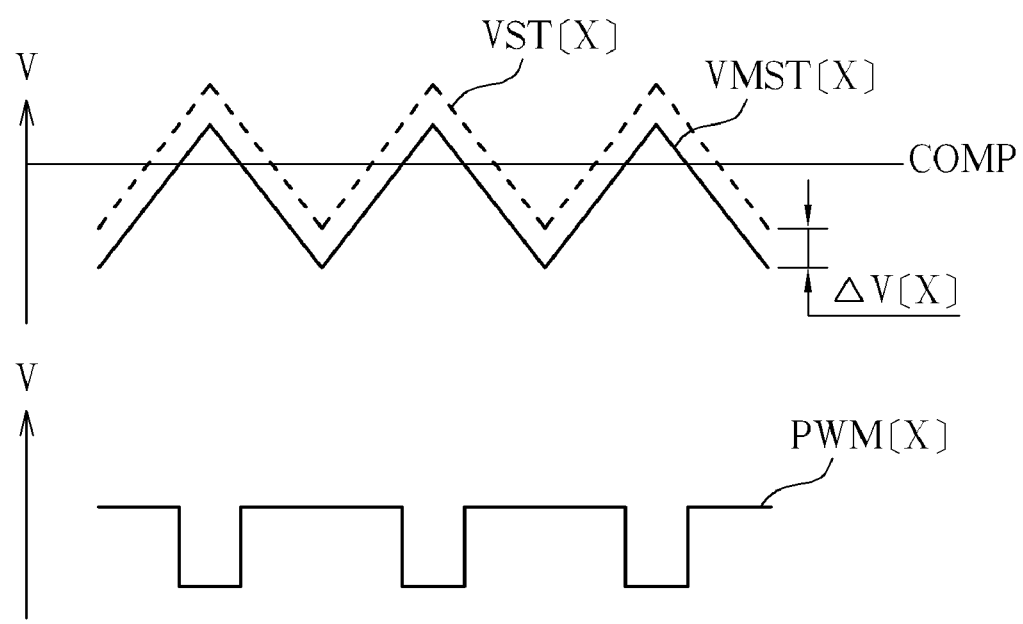

In detail, the computing unit 316_x preferably shifts a DC bias V[x] of the sawtooth signal VST[x] in accordance with the magnitude of the compensating result CPS[x], i.e. ΔV[x]=CPS[x], such that the modulated sawtooth signal (computing result) VMST[x]=VST[x]+CPS[x]=VST[x]+K×(SEN[x]−SEN[x−1]). For example, please refer to FIG. 4A, FIG. 4B and FIG. 4C. FIG. 4A is a time-variant schematic diagram of the sawtooth signal VST[x] directly sent to the parallel comparator 318_x without modulation and the corresponding PWM signal PWM[x]. Assume that one of the channel currents is higher than the others by a wide margin. In such a situation, the subtracting result SUB[x] corresponding to the converting channel with the maximum channel current has SUB[x]=SEN[x]−SEN[x−1]>0, and the computing unit 316_x accordingly shifts "up" the sawtooth signal VST[x] by a margin of ΔV[x]=K×(SEN[x]−SEN[x−1]) to generate the computing result VMST[x], as illustrated in FIG. 4B. As a result, an "ON" ratio of the PWM signal PWM[x] can be reduced to decay the maximum channel current. Inversely, if one of the channel currents is lower than the others by a wide margin, the computing unit 316_x shifts "down" the DC bias V[x] of the sawtooth signal VST[x] to increase the "ON" ratio of the PWM signal PWM[x], so as to enhance the minimum channel current, as illustrated in FIG. 4C.

Figure 4D:
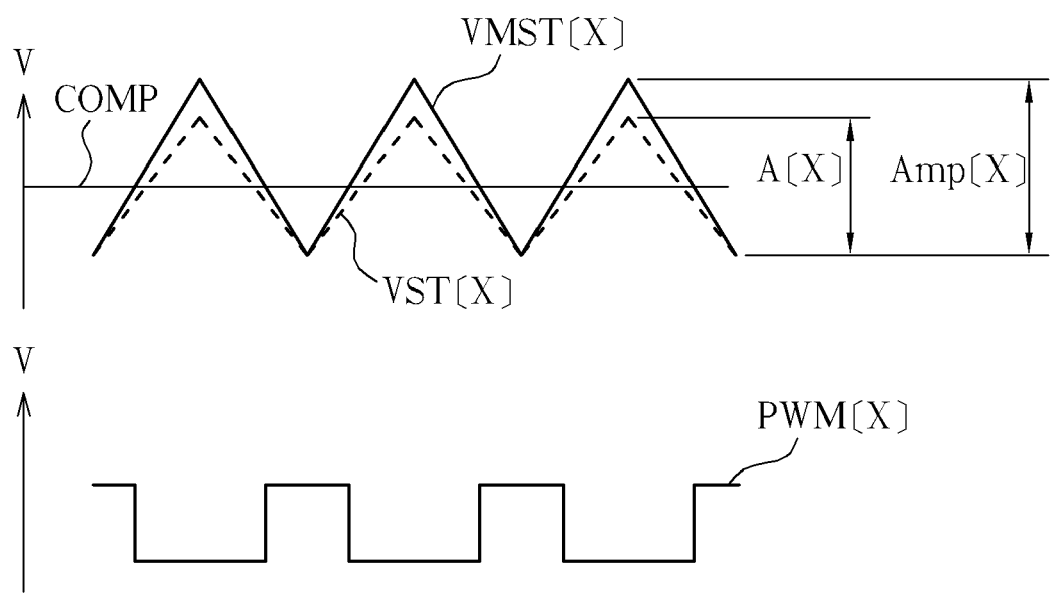
Figure 4E:
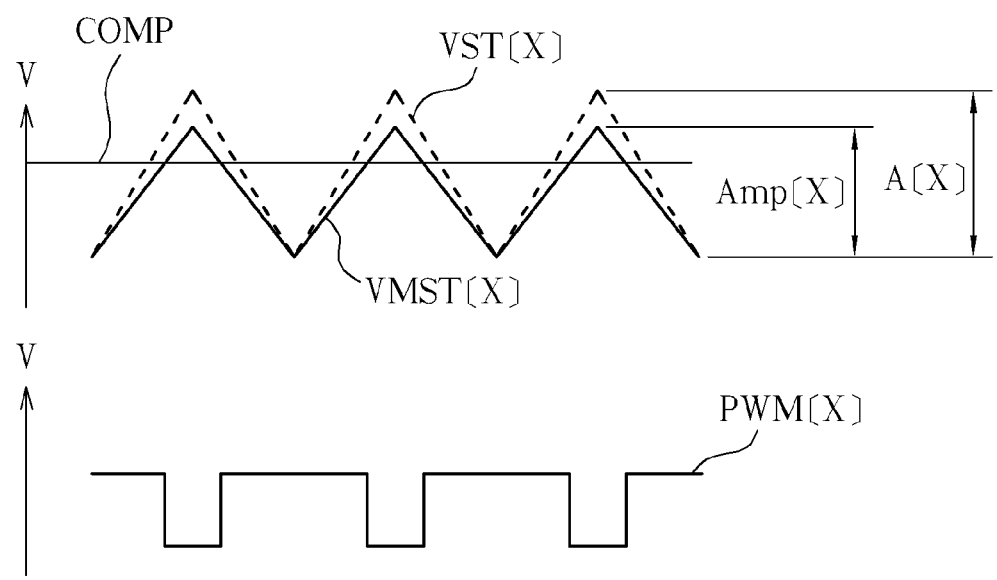

Moreover, the computing unit 316_x can further be utilized for adjusting an amplitude A[x] (or slope) of the sawtooth signal VST[x] in accordance with the magnitude of the compensating result CPS[x], such that an amplitude Amp[x] of the computing result VMST[x] has Amp[x]=A[x]+CPS[x]=A[x]+K×(SEN[x]−SEN[x−1]). For example, please refer to FIG. 4D and FIG. 4E. Similarly, assume that one of the channel currents is higher than the others by a wide margin. In such a situation, the subtracting result SUB[x] corresponding the converting channel with the maximum channel current has SUB[x]=SEN[x]−SEN[x−1]>0, and the computing unit 316_x accordingly scales "up" the amplitude A[x] of the sawtooth signal VST[x] to the amplitude Amp[x], to generate the computing result VMST[x], as illustrated in FIG. 4D. As a result, the "ON" ratio of the corresponding PWM signal PWM[x] can be reduced to decay the maximum channel current. Inversely, if one of the channel currents is lower than the others by a wide margin, the computing unit 316_x scales "down" the amplitude A[x] of the sawtooth signal VST[x] to the amplitude Amp[x], to increase the "ON" ratio of the PWM signal PWM[x], so as to enhance the minimum channel current, as illustrated in FIG. 4E.

FIG. 4B to FIG. 4E illustrate a fact that regardless of whether the DC bias V[x] or the amplitude A[x] of the sawtooth signal VST[x] is modified, the control device 30 can balance each channel current in a systematic and orderly way by means of adjusting the duty cycle of the PWM signal PWM[x].

Figure 1:
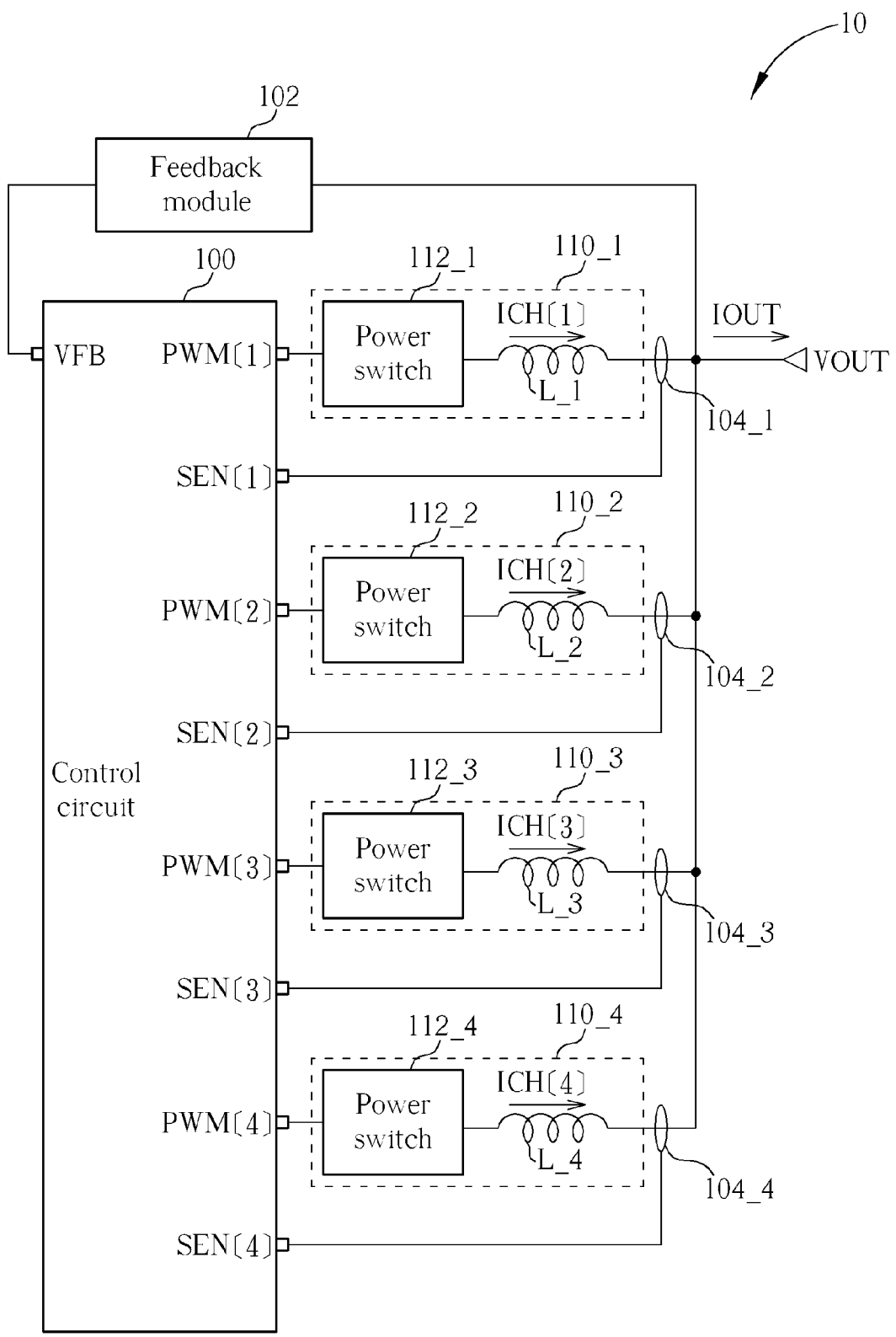
FIG. 1 is a schematic diagram of a multi-phase DC-DC converter of the prior art.
Figure 2:
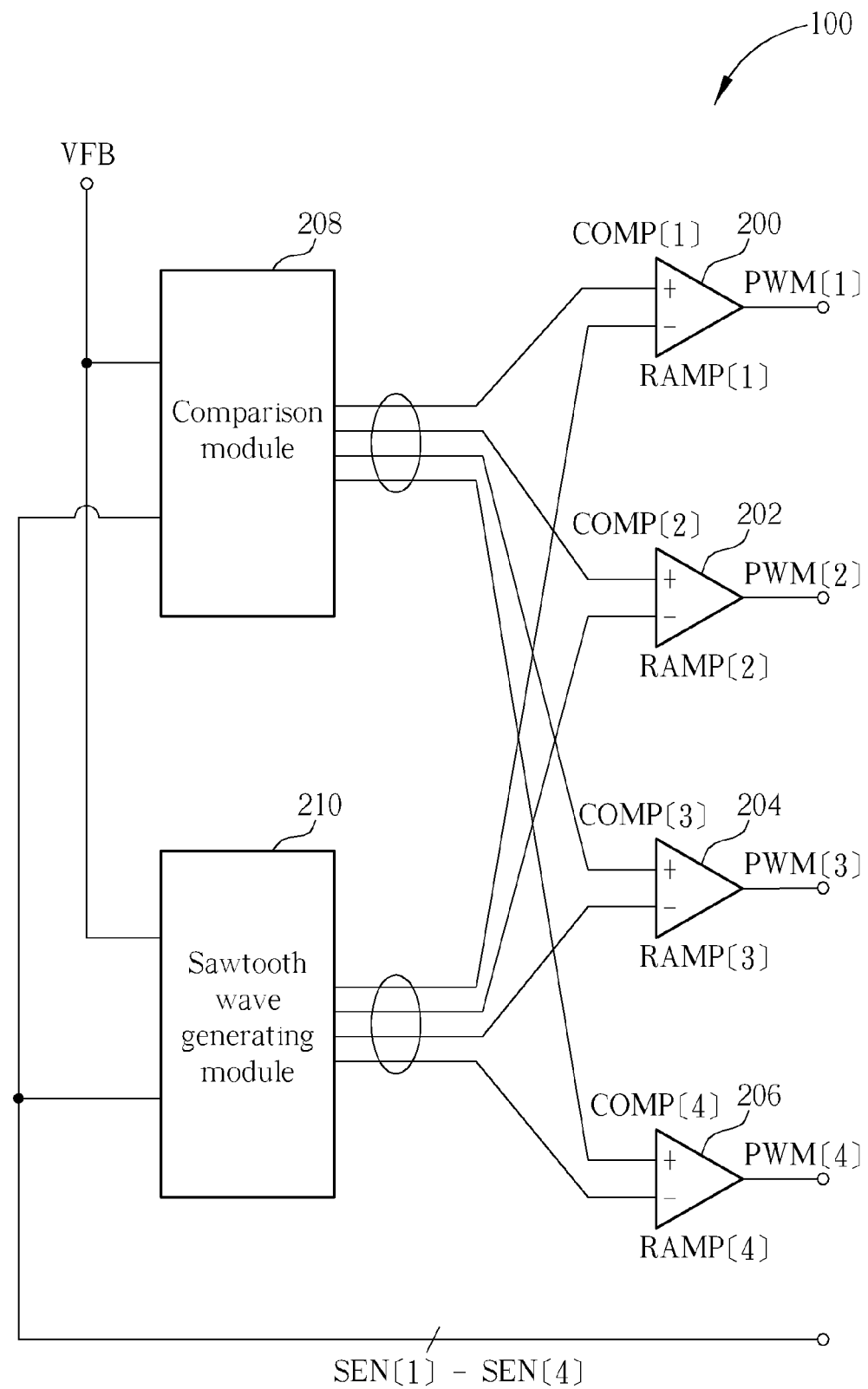
FIG. 2 is a schematic diagram of a control circuit shown in FIG. 1.
Figure 5:
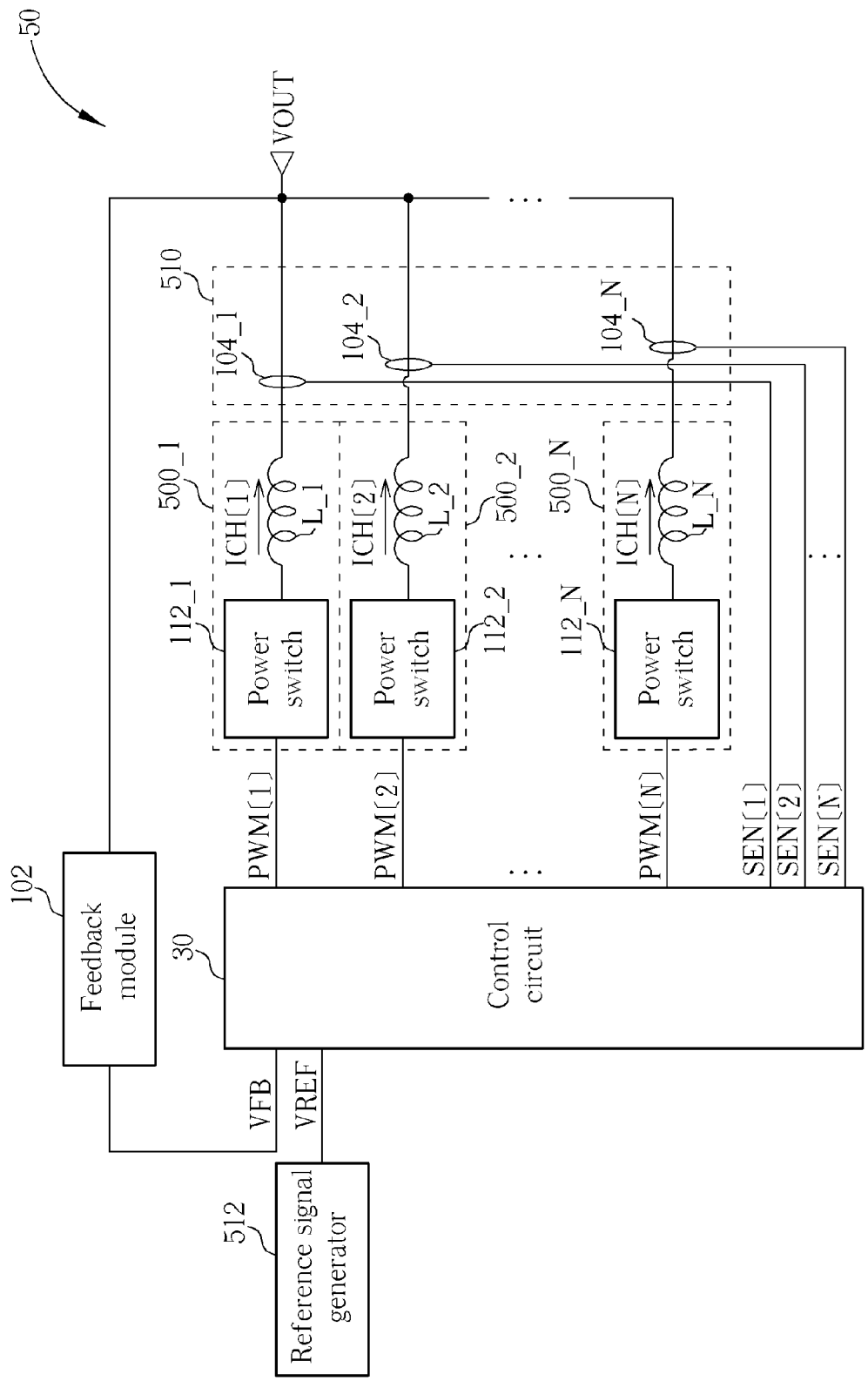
FIG. 5 is a schematic diagram of a multi-phase DC-DC converter according to an embodiment of the present invention.

To implement the control device 30, please refer to FIG. 5, which is a schematic diagram of a multi-phase DC-DC converter 50 according to an embodiment of the present invention. The control device 30 and the multi-phase DC-DC converter 10 of the prior art are integrated into the multi-phase DC-DC converter 50. For simplicity, in FIG. 5 and FIG. 1, similar reference numerals are utilized to denote similar units. The multi-phase DC-DC converter 50 includes N converting channels 500_1-500_N, which can be removed or added based upon practical conditions, and therefore differs from the multi-phase DC-DC converter 10, which includes a fixed number of converting channels. In addition, in the multi-phase DC-DC converter 50, the current sensors 104_1-104_N are integrated into a current sensing module 510 to generate the sensing signals SEN[1]-SEN[N] required by the control device 30. Lastly, the multi-phase DC-DC converter 50 further includes a reference signal generator 512 for generating a reference signal VREF required by the error amplifier 300 of the control device 30.

Figure 6:
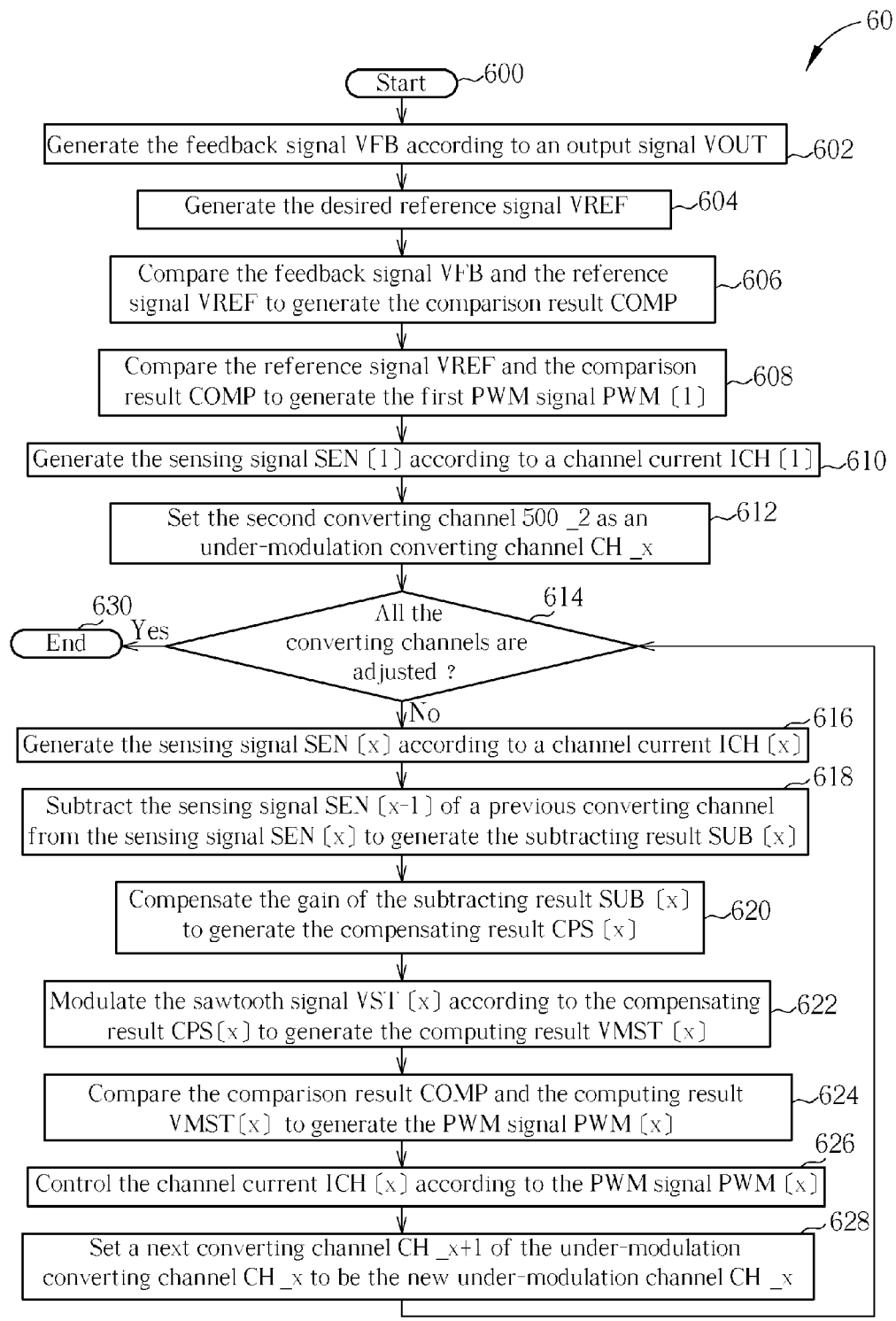
FIG. 6 is a schematic diagram of a control process according to an embodiment of the present invention.

Operations of the multi-phase DC-DC converter 50 and the control device 30 can be summarized into a control process 60, as illustrated in FIG. 6. The control process 60 includes the following steps:

Step 600: Start.

Step 602: The feedback module 102 generates the feedback signal VFB according to an output signal VOUT of the multi-phase DC-DC converter 50.

Step 604: The reference signal generator 512 generates the desired reference signal VREF.

Step 606: The error amplifier 300 compares the feedback signal VFB and the reference signal VREF to generate the comparison result COMP.

Step 608: The main comparator 302 compares the reference signal VREF and the comparison result COMP to generate the first PWM signal PWM[1].

Step 610: The current sensing module 510 generates the sensing signal SEN[1] according to a channel current ICH[1] passing through an output inductor L_1 of the first converting channel 600_1.

Step 612: Set the second converting channel 500_2 as an under-modulation converting channel CH_x.

Step 614: Determine whether channel currents of all the converting channels are adjusted? If yes, proceed to Step 630; else, proceed to Step 616.

Step 616: The current sensing module 510 generates the sensing signal SEN[x] according to a channel current ICH[x] passing through the output inductor L_x of the under-modulation converting channel CH_x.

Step 618: The subtracter 312_x subtracts the sensing signal SEN[x−1] of a previous converting channel from the sensing signal SEN[x] to generate the subtracting result SUB[x].

Step 620: The compensating unit 314_x compensates the gain of the subtracting result SUB[x] to generate the compensating result CPS[x].

Step 622: The computing unit 316_x modulates the sawtooth signal VST[x] corresponding to the under-modulation converting channel CH_x according to the compensating result CPS[x] to generate the computing result VMST[x].

Step 624: The parallel comparator 310_x compares the comparison result COMP and the computing result VMST[x] to generate the PWM signal PWM[x] sent to the power switch 112_x of the under-modulation converting channel CH_x.

Step 626: The power switch 112_x controls the channel current ICH[x] according to the PWM signal PWM[x].

Step 628: Set a next converting channel CH_x+1 of the under-modulation converting channel CH_x to be the new under-modulation channel CH_x, and proceed to Step 614.

Step 630: End.

Detailed description of the control process 60 can be referred from the above, and are not further narrated.

In the prior art, the control circuit 100 can be utilized for balancing channel currents of the multi-phase DC-DC converter 10 including a fixed number (4) of converting channels by "averaging" all sensing signals. Thus, the control circuit 100 has to include massive and complex circuits to perform the step of averaging all sensing signals, implying a remarkable increase of power consumption and circuit layout area of the multi-phase DC-DC converter 10. In comparison, the quantity of converting channels of the multi-phase DC-DC converter 50 of the present invention is flexible and not limited to 4. Based upon the control process 60, the multi-phase DC-DC converter 50 can balance the channel current of each converting channel in a systematic and orderly way to prevent problems induced by current imbalance, such as overheating components, shorter component life, etc. In addition, the present invention replaces the steps of averaging all sensing signals with the steps of comparing sensing signals corresponding to "current" and "previous" converting channels. As a result, practical layout complexity of the circuit can be greatly simplified, such that the multi-phase DC-DC converter 50 can balance channel currents in a simpler, more economic way.

To sum up, via comparing sensing signals of current and previous converting channels, the present invention can systematically adjust the channel current of each converting channel to achieve the goal of current balance.

Those skilled in the art will readily observe that numerous modifications and alterations of the device and method may be made while retaining the teachings of the invention.

What is claimed is:

1. A control device for a multi-phase DC-DC converter, the multi-phase DC-DC converter comprising a plurality of converting channels, the control device comprising:

an error amplifier for comparing a feedback signal of the multi-phase DC-DC converter and a reference signal to generate a comparison result;

a main comparator coupled to the error amplifier for comparing the comparison result and a first sawtooth signal corresponding to a first converting channel of the plurality of converting channels to generate a first pulse width modulation (PWM) signal; and at least one computing module, each computing module corresponding to one of the plurality of converting channels, for generating a PWM signal according to the comparison result, a sawtooth signal corresponding to the converting channel, a sensing signal corresponding to the converting channel, and a sensing signal corresponding to a previous converting channel of the converting channel to control the converting channel;

wherein each computing module comprises:

a subtracter for subtracting the sensing signal corresponding to the converting channel from the sensing signal corresponding to the previous converting channel to generate a subtracting result;

a compensating unit coupled to the subtracter for compensating a gain of the subtracting result according to the subtracting result to generate a compensating result;

a computing unit coupled to the compensating unit for adjusting the sawtooth signal corresponding to the converting channel according to the compensating result to generate a computing result; and a parallel comparator coupled to the error amplifier and the computing unit for comparing the comparison result of the error amplifier and the computing result to generate the PWM signal corresponding to the converting channel.

2. The control device of claim 1, wherein the computing unit shifts a DC bias of the sawtooth signal according to the compensating result to generate the computing result.

3. The control device of claim 1, wherein the computing unit adjusts an amplitude of the sawtooth signal according to the compensating result to generate the computing result.

4. The control device of claim 1, wherein each computing module corresponds to one of the plurality of converting channels other than the first converting channel.

5. A multi-phase DC-DC converter comprising:

an output end for providing an output signal;

a plurality of converting channels, each converting channel comprising:

a power switch for adjusting a channel current of the converting channel according to a pulse width modulation (PWM) signal corresponding to the converting channel; and an output inductor coupled between the power switch and the output end;

a current sensing module comprising a plurality of sensing units, each coupled to an output inductor of a corresponding converting channel to generate a feedback signal according to a channel current passing through the output inductor;

a feedback module coupled to the output end for generating a feedback signal according to the output signal;

a reference signal generator for generating a reference signal; and a control device comprising:

an error amplifier coupled to the feedback module and the reference signal generator for comparing the feedback signal and the reference signal to generate a comparison result;

a main comparator coupled to the error amplifier and a power switch of a first converting channel of the plurality of converting channels for comparing the comparison result and a first sawtooth signal corresponding to the first converting channel to generate a first PWM signal sent to the power switch; and at least one computing module, each computing module corresponding to one of the plurality of converting channels for generating a PWM signal sent to a power switch of the converting channel according to the comparison result, a sawtooth signal corresponding to the converting channel, a sensing signal corresponding to the converting channel, and a sensing signal corresponding to a previous converting channel of the converting channel;

wherein each computing module comprises:

a subtracter coupled to the current sensing module for subtracting the sensing signal corresponding to the converting channel from the sensing signal corresponding to the previous converting channel to generate a subtracting result;

a compensating unit coupled to the subtracter for compensating a gain of the subtracting result according to the subtracting result to generate a compensating result;

a computing unit coupled to the compensating unit for adjusting the sawtooth signal corresponding to the converting channel according to the compensating result to generate a computing result; and a parallel comparator coupled to the error amplifier, the computing unit and the power switch of the converting channel for comparing the comparison result of the error amplifier and the computing result to generate the PWM signal corresponding to the converting channel.

6. The multi-phase DC-DC converter of claim 5, wherein the computing unit shifts a DC bias of the sawtooth signal according to the compensating result to generate the computing result.

7. The multi-phase DC-DC converter of claim 5, wherein the computing unit adjusts an amplitude of the sawtooth signal according to the compensating result to generate the computing result.

8. The multi-phase DC-DC converter of claim 5, wherein each computing module corresponds to one of the plurality of converting channels other than the first converting channel.

* * * * *